US007210158B1

(12) United States Patent
Forler (10) Patent No.: US 7,210,158 B1
(45) Date of Patent: Apr. 24, 2007

(54) PROGRAM SIGNAL BLOCKING SYSTEM (75) Inventor: Joseph Wayne Forler, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/581,709

(22) PCT Filed: Dec. 18, 1997

(86) PCT No.: PCT/US07/23363

§ 371 (c)(1),
(2), (4) Date: Oct. 10, 2000

(87) PCT Pub. No.: WO99/31881

PCT Pub. Date: Jun. 24, 1999

(51) Int. Cl.
*H04N 7/167* (2006.01)
(52) U.S. Cl. .............................. 725/31; 725/28; 725/29
(58) Field of Classification Search ............ 725/26–31, 725/38–40; 348/734
See application file for complete search history.

(56) References Cited

U.S. PATENT DOCUMENTS

| 4,768,229 A | * | 8/1988 | Benjamin et al. ............. 725/26 |
| 5,056,139 A | | 10/1991 | Littlefield |
| 5,465,113 A | * | 11/1995 | Gilboy ........................ 725/29 |
| 5,548,345 A | * | 8/1996 | Brian et al. ................... 725/27 |
| 5,550,575 A | * | 8/1996 | West et al. ................... 725/28 |
| 5,583,576 A | * | 12/1996 | Perlman et al. ............... 725/28 |
| 5,812,928 A | * | 9/1998 | Watson et al. .............. 725/118 |
| 5,828,402 A | * | 10/1998 | Collings ....................... 725/28 |
| 5,872,588 A | * | 2/1999 | Aras et al. .................... 725/14 |
| 5,907,321 A | * | 5/1999 | Grossman et al. ............ 725/32 |
| 5,949,471 A | * | 9/1999 | Yuen et al. ................... 725/27 |
| 5,969,748 A | * | 10/1999 | Casement et al. ............ 725/27 |

(Continued)

FOREIGN PATENT DOCUMENTS

EP       777385       6/1997

(Continued)

*Primary Examiner*—Chris Kelley
*Assistant Examiner*—Annan Q. Shang
(74) *Attorney, Agent, or Firm*—Joseph J. Laks; Robert D. Shedd (57) ABSTRACT

An apparatus and a method for preventing a user from bypassing a viewer blocking system using program related information, such as content ratings, included in a program signal. The present invention prevents the user from exploiting the time delay associated with detecting, decoding and comparing the program related information by switching channels to observe portions of objectionable programs before the blocking system can react. The present system comprises a processor (110) which controls the output of a selected program signal (VIDEO, VIDEO IN, AUDIO IN) in response to a determination of whether an associated program related information meets a user selected blocking criteria. The processor blocks display of a program signal when a predetermined sequence of signal channel selections is detected and then continues to block the display of the program signal at least until the determination is performed. The predetermined sequence of signal channel selections may comprise continual re-tuning of the same channel and/or switching between two channels. The present method comprises detecting a particular sequence of signal channel selections and blocking the display of the program signal upon detecting the predetermined sequence. If the predetermined sequence of signal channel selections is detected the display blocking is maintained at least until a program related information associated with the program signal is detected and a determination of the satisfaction of a user selected blocking criteria is performed.

12 Claims, 4 Drawing Sheets

U.S. PATENT DOCUMENTS

| | | | |
|---|---|---|---|
| 5,995,133 A * | 11/1999 | Kim | 725/28 |
| 6,005,631 A * | 12/1999 | Anderson et al. | 725/53 |
| 6,025,869 A * | 2/2000 | Stas et al. | 725/28 |
| 6,125,259 A * | 9/2000 | Perlman | 725/28 |
| 6,144,401 A * | 11/2000 | Casement et al. | 725/30 |
| 6,216,228 B1 * | 4/2001 | Chapman et al. | 713/176 |
| 6,321,381 B1 * | 11/2001 | Yuen et al. | 725/28 |
| 6,429,879 B1 * | 8/2002 | Sturgeon et al. | 345/723 |
| 6,505,346 B2 * | 1/2003 | Saib et al. | 725/38 |
| 6,701,523 B1 * | 3/2004 | Hancock et al. | 725/25 |
| 2002/0013941 A1 * | 1/2002 | Ward et al. | 725/25 |

FOREIGN PATENT DOCUMENTS

| | | |
|---|---|---|
| WO | 97/23996 | 7/1997 |
| WO | 97/42759 | 11/1997 |

* cited by examiner

PROGRAM SIGNAL BLOCKING SYSTEM

The present invention relates to a system for processing and outputting a program signal, such as a television or a radio program signal, and more particularly to a system for processing and outputting a program signal in accordance with auxiliary information included with the program signal.

In addition to the video and/or audio program portions of a particular television or radio program, program signals may include auxiliary information. The program and auxiliary information may comprise analog and/or digital signals. An analog signal, such as an NTSC standard television signal, may include auxiliary data during horizontal line intervals within the vertical blanking interval (VBI). For example, closed caption data is included in line 21, field 1 of the VBI and Extended Data Services (XDS) information is included in line 21, field 2 of the VBI. In digital systems, the video signals are usually transmitted in packets, or groups, of data words. Each packet includes identifying information and represents a particular type of information such as video, audio or auxiliary information. An example of a digital television system that processes a packetized digital television signal is the DSS® (Digital Satellite System) receiver manufactured by Thomson Consumer Electronics, Inc., of Indianapolis, Ind.

One application of auxiliary information relates to the so-called "V-chip" technology which allows users to automatically block out objectionable material from their television receivers. In systems utilizing this technology, program related information included with the program signals provide advisory information about the respective programs. The program advisory information may take several forms, including, but not limited to program ratings that indicate recommended viewer age and/or content ratings that indicate the presence and/or level of objectionable material, such as sex, violence, language, etc., in the program. For example; a proposed program rating system is described in proposed EIA-744 specification entitled, "Transport of Content Advisory Information using Extended Data Service (XDS)."

The V-chip technology examines the program advisory information associated with each selected program signal against a user selected blocking criteria, such as a selected rating blocking level, and blocks out the program signal if the program advisory information meets the user selected blocking criteria. For example, if the blocking level is set at "PG", all programs with a rating of "PG" and higher, such as "R", "NC-17" and "X", would be blocked. Blocking the program signal refers to preventing user access to an objectionable program by, for example, rendering the video black or otherwise indecipherable, muting the audio and disabling the display of program related closed caption. When the program advisory information indicates that objectionable material is no longer being received, the V-chip system unblocks the program channel by displaying the video, unmuting the audio and/or enabling the display of program related closed caption.

One difficulty associated with the V-chip technology described above is the delay time required for a television receiver to receive and decode program related information. Since program related information is transmitted periodically, in between video, audio and other information, a television receiver may experience a delay before receiving and decoding new program related information when a user selects a new channel. For example, the proposed ANSI/EIA-608A technical specification for the transmission of XDS Program Rating packet states that the Program Rating packet should be repeated at intervals no greater than 3 seconds unless delayed by closed caption data. Closed caption data always, takes priority as required by law. So if field 2 captions are present, Program Rating packet transmissions may be delayed longer than 3 seconds. Therefore, when a user selects a new channel, the television receiver may take several seconds to detect and decode the new program related information and take appropriate blocking action. The delay is a noticeable period during which a possibly objectionable program remains unblocked and may be viewed by unintended audiences.

A user may attempt to exploit the above described delay and bypass such a blocking feature by repeatedly tuning to a particular channel to view or listen to portions of an objectionable program before the blocking feature can be activated. For example, the user may continually re-select the same channel or continually switch between two or more channels to view or listen to significant portions of an objectionable program.

Therefore, what is needed is a system for preventing a user from bypassing the blocking feature in a system which uses program related information included with the program signal. In particular, what is needed is a system for preventing a user from exploiting the delay associated with detecting, decoding and examining program related information, in order to bypass the blocking feature.

The present invention overcomes the difficulties noted above by providing a system which prevents a user from exploiting the time delay noted above. The present invention is particularly suitable for use in signal output apparatuses that can tune to one of a plurality of signal channels and provide video and/or audio signal outputs. Such apparatuses include, but are not limited to, television receivers, digital satellite receivers, VCR's, video disk players and audio signal receivers.

The present system comprises a signal processor which provides an output signal associated with a program signal of a selected signal channel and controls user access to the program signal in response to a determination of whether program related information included in the program signal meets a user selected blocking criteria. User selected blocking criteria can take many forms including, but not limited to a particular rating blocking level, in which case the system prevents user access to the output signal if the received program related information equals or exceeds the user selected rating blocking level. Program related information may include, but is not limited to, recommended viewer age ratings, program content ratings, program title and program summary. Upon activation of an appropriate blocking mode, if a new signal channel is selected and a predetermined sequence of signal selections is detected, the processor automatically controls the output signal associated with the newly selected channel in a predetermined manner to prevent user access to the program associated with the newly selected channel, and continues such control at least until the processor determines whether the blocking criteria is met with respect to the newly selected channel. Preferably, the signal processor continues such control of the output signal at least until the program related information is determined and compared with a user selected blocking level.

The output signal is controlled in a predetermined manner to prevent user access to the selected program signal. It is to be understood that such manner of control includes any processes and modification to the program signal that render the program, or portions of the program visually and/or aurally incomprehensible to the user, including, but not limited to, interrupting the signal path, replacing the normal program signal with a blocking level, scrambling the output signal and/or replacing the output signal with an On Screen Display (OSD) signal representing a displayed message indicating activation of the blocking feature. Such control methods advantageously result in, for example, blanking the video portion, muting the audio portion, and disabling the closed captions associated with the program.

The predetermined sequence of channel selections may comprise a predetermined number of re-selections of the previously selected channel and/or re-selections of two or more channels. The present system may be configured such that the above-noted manner of preventing user access only occurs if the newly selected channel had a previously detected program related information which met the user selected blocking criteria. By automatically controlling the output signal in the above-noted manner when a predetermined sequence of signal channel selections is detected, the present invention prevents a user from accessing objectionable material during the delay time when the program related information is detected and a determination of whether the blocking criteria is met is performed.

The present system may also be configured such that the blocking feature is active only if a user selects an appropriate blocking mode.

The present system may also be configured such that the blocking feature is activated only if at least a particular number of predetermined sequences of signal selections occurs over a particular period of time.

The invention will be described with reference to the accompanying drawings, wherein.

Figure 1:
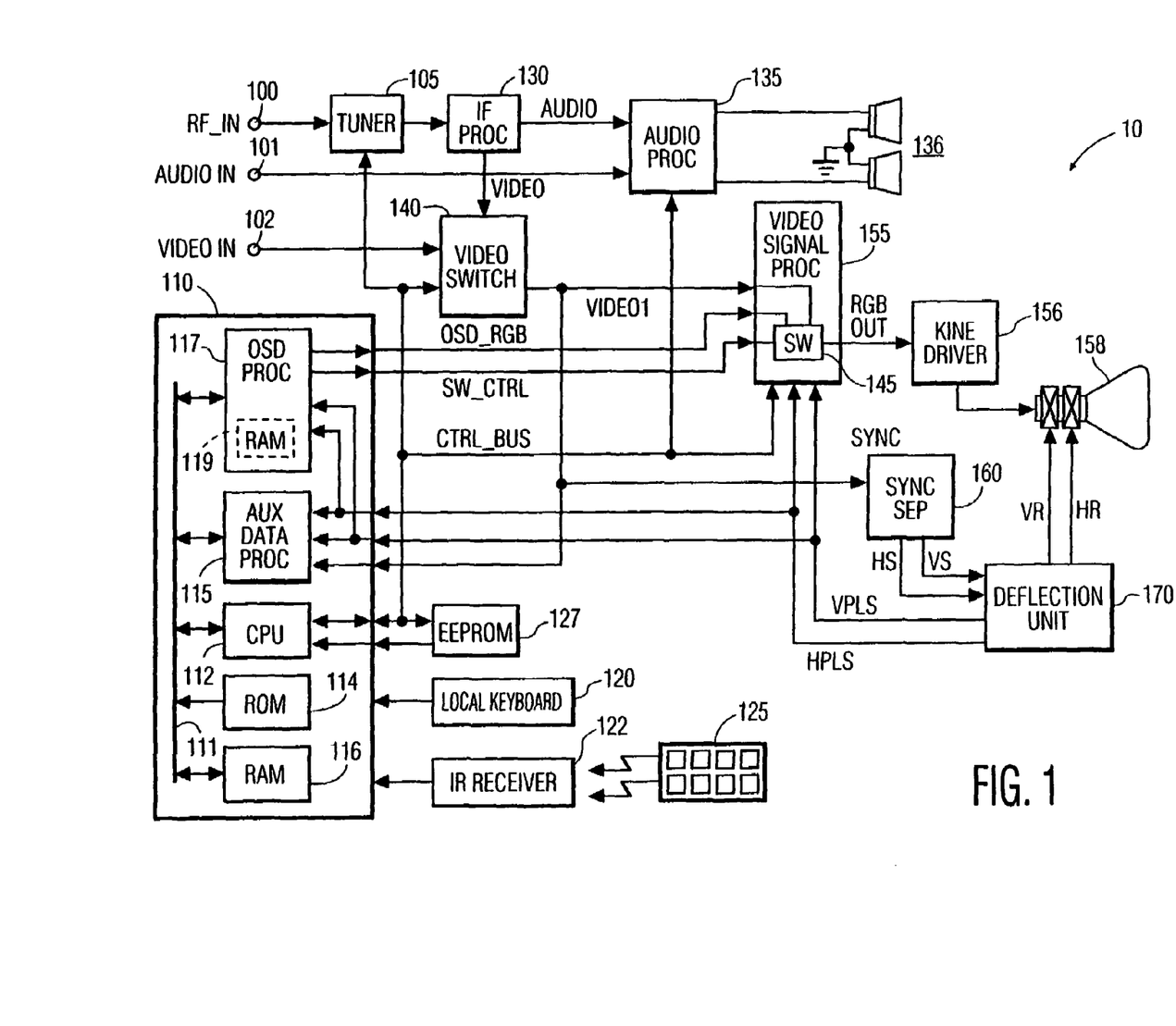
FIG. 1 is a block diagram of a television system embodying principles of the present invention.

An exemplary television receiver system 10 shown in FIG. 1 includes input terminal 100 which receives radio frequency (RF) television signals, e.g., from an antenna or cable, and applies the television signals to tuner assembly 105. Tuner assembly 105 selects and amplifies a particular RF signal associated with the selected television channel in response to control signals from controller 110. As used herein, the terms "controller", "control processor", "microprocessor" (or µP), and "microcomputer" (or µC) are equivalent and refer to devices which may or may not be in integrated circuit (IC) form and are capable of performing control functions.

As shown in FIG. 1, controller 110 includes central processing unit (CPU) 112, ROM 114 and RAM 116 interconnected via bus 111 and operating in a manner typical of microcomputers such as the ST9 integrated circuit (IC) manufactured by SGS Thomson, Inc. CPU 112 generates control signals to control the output of system 10 in response to software instructions stored in ROM 114 and EEPROM 127 and in response to user-provided command codes received through keyboard 120 and/or infra-red (IR) receiver 122. Controller 110 receives command codes from IR remote control 125 via IR receiver 122.

Control signals generated by controller 110 are provided to other components of system 10, such as tuner 105, via a control bus represented by the path labeled CTRL_BUS in FIG. 1. A typical implementation of the control bus shown in FIG. 1 includes, but is not limited to, a two-wire serial bus based on the Inter-Integrated Circuit (IIC or I2C) bus protocol supported by Philips.

IR remote control 125 and/or keyboard 120 permit a user to select a particular blocking criteria for automatically blocking objectionable material. The blocking criteria can take many forms including, but not limited to, blocking a program if an associated program related information, such as program ratings, equals or exceeds a user set information or ratings level. An example of an alternative blocking criteria is activating blocking in response to detecting a user-specified word or words in title or program description information included in the program related information. The user selected blocking criteria, which may be a ratings level as noted above, is stored in controller 110 and examined by CPU 112 to block or unblock a program as described further below. The user selection can be made, for example, by selecting a particular blocking mode and/or blocking level from an On Screen Display menu.

When a user selects a particular television channel by activating either keyboard 120 or remote control 125, controller 110 produces a control signal on bus CTRL_BUS which causes tuner 105 to tune to the RF signal of the selected channel. Tuner 105 outputs an intermediate frequency (IF) signal corresponding to the tuned channel to IF processor 130. IF processor 130 includes circuits such as, but not limited to, a video IF (VIF) amplifying stage, an AFT circuit, a video detector, and a sound IF (SIF) amplifying stage for processing the IF signal to produce baseband composite video signal VIDEO and sound carrier signal AUDIO. Audio signal processor 135 includes an audio detector and a stereo decoder that process signal AUDIO to produce a baseband audio signal suitable for driving speaker unit 136. Baseband composite video signal VIDEO from IF processor 130 is applied to video switch 140. Another video signal VIDEO IN may be provided to the present system by an external signal source, for example a VCR, via signal input 102. The external signal source may also provide an audio signal AUDIO IN via signal input 101. Controller 110 controls the respective outputs of video switch 140 and audio processor 135 in response to user selection of the signal source. It is to be understood that a plurality of external signal inputs may be provided to accommodate a plurality of external signal sources, and video signal switch 140 and audio processor 135 may be modified as necessary to allow user selection of a particular external signal source.

Depending on the user selection, video switch 140 provides signal VIDEO1, which is associated with one of the input signals, to video signal processor 155. Video signal processor 155 processes video signal VIDEO1 to produce red, green and blue (R, G and B) output signals RGB which are suitable for coupling to an image display device. Video signal processor 155 performs processing to provide, inter alia, automatic chroma and luma control and enable user-controlled features such as contrast and brightness control.

The RGB signals produced by video signal processor 155 are amplified to appropriately high voltage levels by kinescope driver amplifiers 156 before being coupled to kinescope 158 to display the desired image. The display on kinescope 158 is controlled by vertical and horizontal deflection signals VR and HR, respectively, that are coupled to deflection coils of kinescope 158. Deflection unit 170 produces signals HR and VR in response to horizontal and vertical sync signals HS and VS, respectively, that are separated from the synchronization component of output baseband signal VIDEO. Those parts of the system in FIG. 1 that have been described thus far are known, for example, from the CTC-197 color television chassis manufactured by Thomson Consumer Electronics, Indianapolis, Ind.

The system shown in FIG. 1 also includes an auxiliary data processor 115 for detecting and decoding various auxiliary information, including program related information, such as program ratings and/or content ratings, included with a video signal. Also, closed caption decoding functions may be included within auxiliary data processor 115 which is coupled with On Screen Display (OSD) processor 117 in order to insert closed caption information into the appropriate portions of the video display. Data processors for extracting auxiliary information from a video signal are conventionally known and typically include a data slicer, timing signal generators, control mechanisms, decoders and memory, among other things. Any one of a number of such conventionally known auxiliary data processors may be used in the present television system. For example, a system suitable for extracting auxiliary information from a video signal is disclosed in U.S. Pat. No. 5,561,469 entitled, "Auxiliary Video Data Slicer with Multi-Mode Peak Detection for Determining Sync and Data Slicing Levels."

Auxiliary data processor 115 detects and decodes program related information, such as program ratings, included in signal VIDEO1, and provides the program related information to CPU 112. CPU 112 examines the detected program related information and determines whether a user selected blocking criteria is met, for example, by comparing the detected program related information with a user selected blocking level and determining whether the detected program related information equals or exceeds the user selected blocking level.

If the user selected blocking criteria is met, CPU 112 renders the program inaccessible by controlling the output signal in a predetermined manner. It is to be understood that such manner of control includes any processes and modification to the program signal that render the program, or portions of the program visually and/or aurally incomprehensible to the user as noted above. For example, controller 110 provides control signals to disable the output of audio processor 135, disable closed caption output and replace the normal program signal with an appropriate OSD signal, such as a uniform blue screen including a message indicating activation of the blocking feature. If the detected program related information does not meet the user selected blocking criteria, CPU 112 allows video signal processor 155 and audio processor 135 to provide output signals associated with the received signals in the conventional manner.

Figure 2:
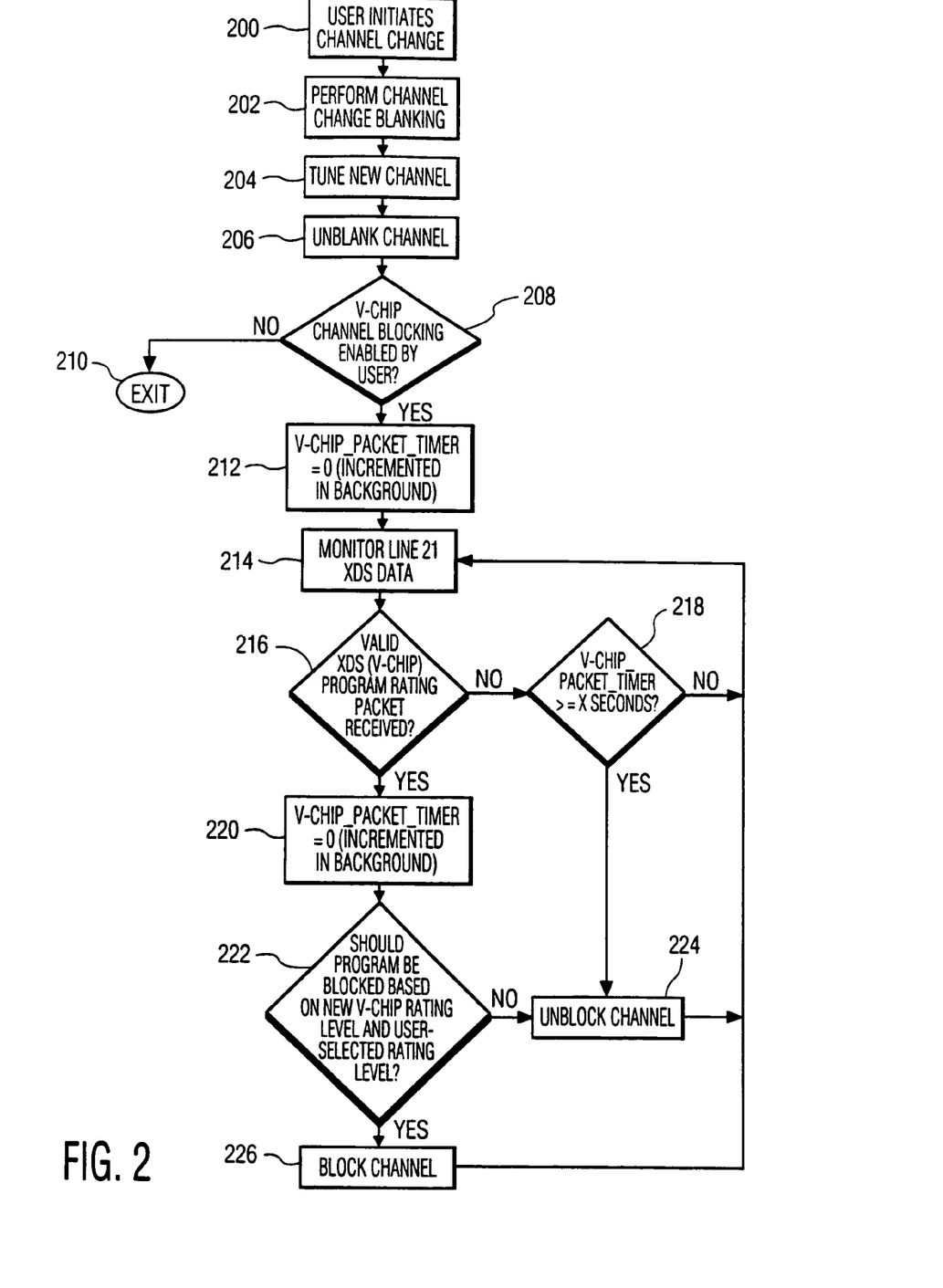
FIG. 2 is a flowchart showing the steps for changing a channel in a television system which does not provide protection against attempts to bypass a program related information based blocking system.

FIG. 2 is a flowchart showing the steps taken by a television system which is not configured to prevent a user from exploiting the delay discussed above. When a user initiates a channel change in step 200, the television system performs a channel blanking in step 202, tunes to a newly selected channel in step 204, and then unblanks the television display in step 206. That is, the newly selected channel is momentarily blanked while the channel is being tuned, but is immediately unblanked after tuner 105 tunes the program signal associated with the new channel.

After the new channel has been tuned and unblanked, the television system determines whether the V-chip channel blocking feature is enabled in step 208. If not, the system exits from the program in step 210. If the blocking feature is enabled, the system sets a V-chip Packet Timer to zero and begins incrementing the timer in step 212. The television system then monitors line 21 XDS data for program related information in step 214.

Once a valid XDS program related information packet has been detected and decoded in step 216, the system resets the V-chip Packet Timer to zero and begins incrementing the timer in a predetermined manner in step 220. The system then compares the newly detected program related information with a user selected blocking level in step 222 to determine whether the user selected blocking criteria is met. If the blocking criteria is met, i.e., the newly detected program related information equals or exceeds the user selected blocking level, the system blocks user access to the channel in step 226 by controlling the output signal as described above, and returns to step 214 to repeat the process of detecting and comparing program related information and blocking/unblocking the channel as necessary. If the blocking criteria is not met, i.e., the newly detected program related information is less than the selected blocking level in step 222, the system allows user access to the program associated with the newly selected channel and returns to step 214 to repeat the monitoring and blocking process as noted above.

Also, if the television system fails to detect a new program related information within a predetermined period of time as determined by the incrementing of the V-chip Packet Timer, the television system will allow user access to the channel, or maintain the channel unblocked, and return to step 214 to repeat the process as noted above. Therefore, the television system continually attempts to detect new program related information and determine whether a user selected blocking criteria is met to control user access to the received program signal.

However, it can be seen that user access to the channel occurs in step 206 prior to the detection of new program related information and determination of whether the blocking criteria is met when a user selects a new channel. As discussed above, a significant amount of time may elapse before new program related information is detected and processed, thereby possibly allowing unintended access to objectionable material.

Figure 3:
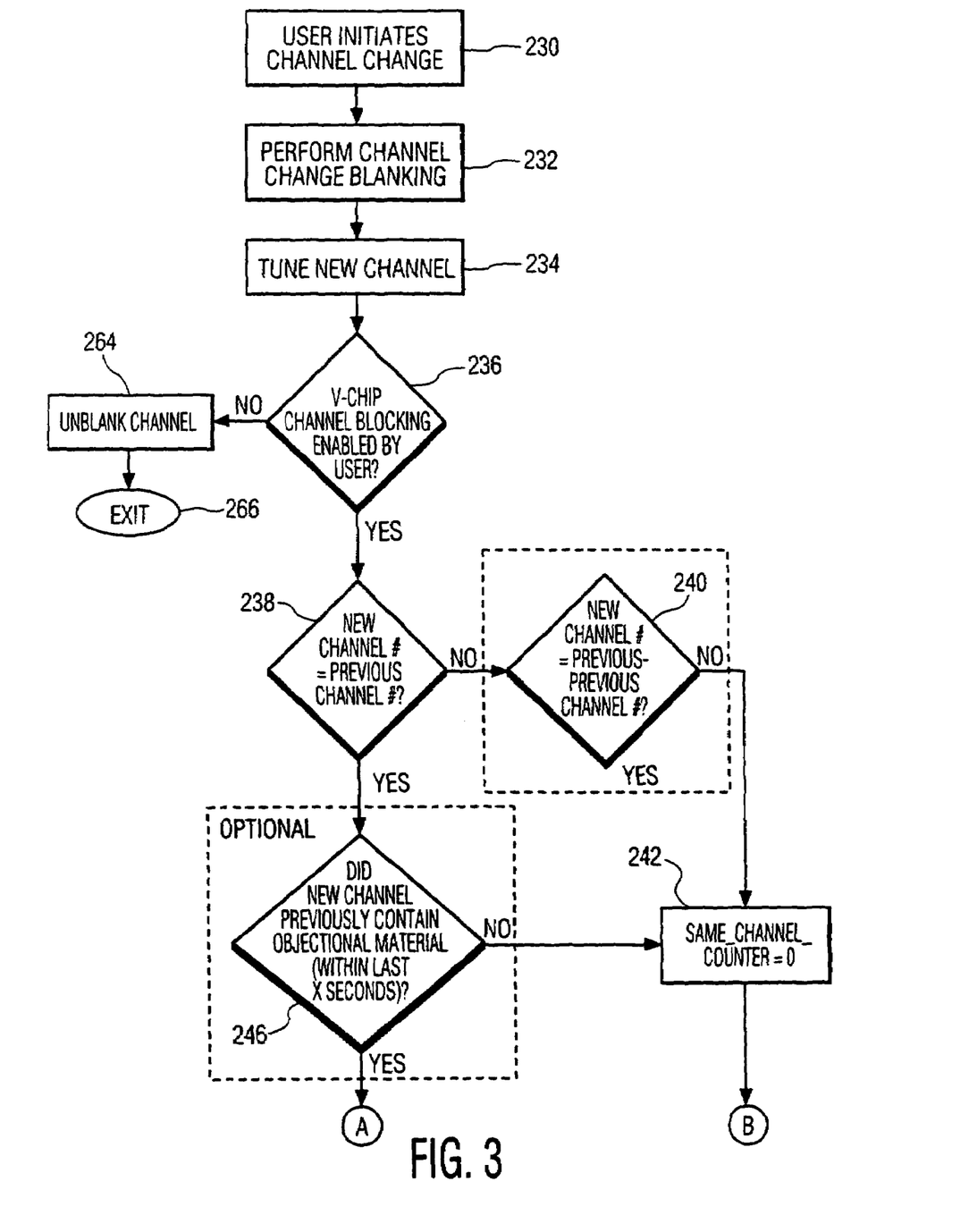
FIGS. 3–4 are flowcharts showing the steps for changing a channel in a television system in accordance with the present invention which provides protection against attempts to bypass a program related information based blocking system.
Figure 4:
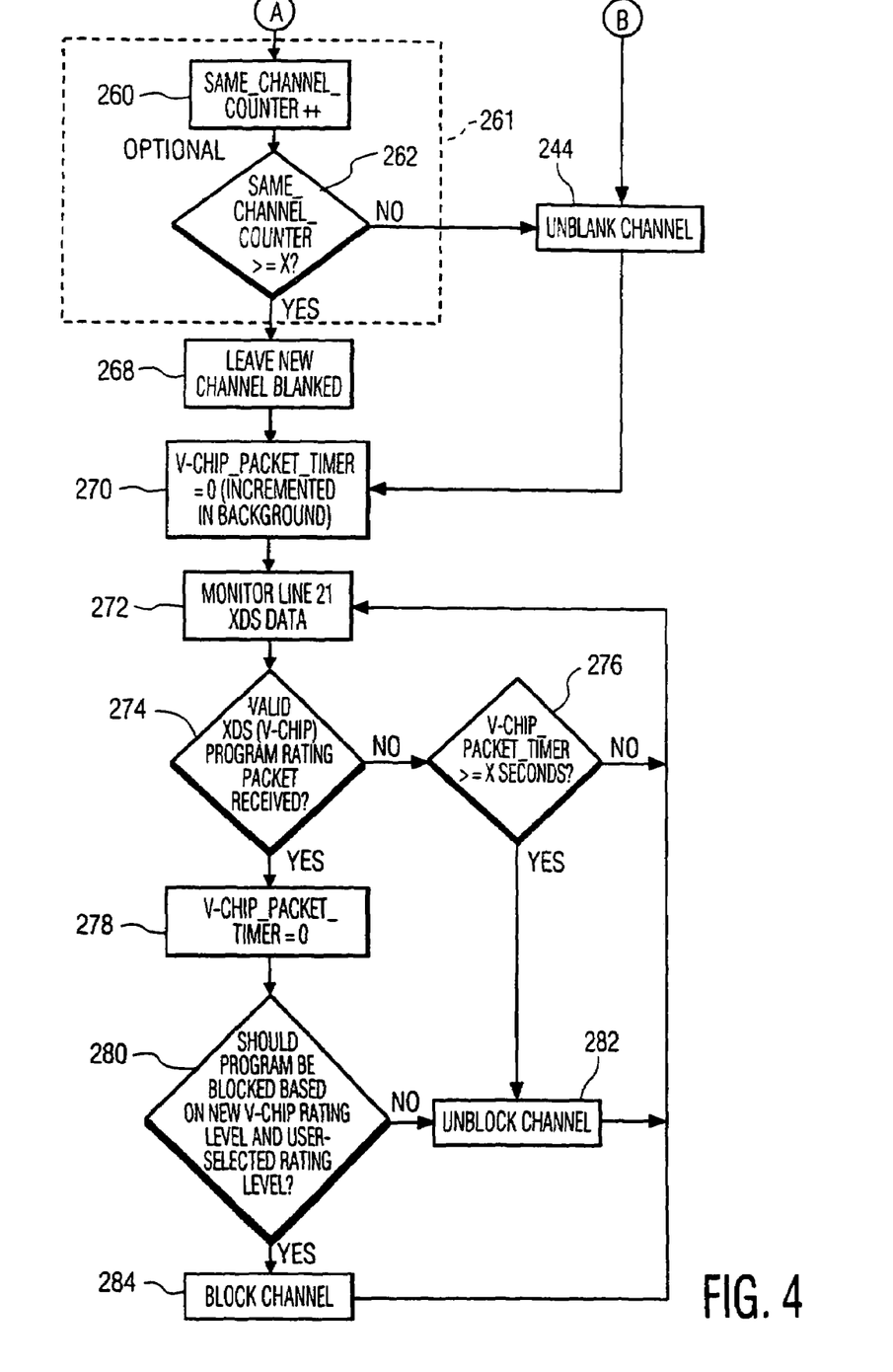

FIGS. 3–4 are flowcharts showing the steps performed by a system according to the present invention which provides protection against a user's attempt to exploit the above-noted delay. The features shown in FIGS. 3–4 can be enabled and controlled by a user, e.g., by using an On Screen Display menu. Access to enable and control the blocking features may be password protected, i.e., require a user to enter a correct password to prevent unauthorized users from modifying previously established settings. Methods for incorporating these features and the steps described below may be programmed into controller 110 using conventionally known methods.

Again, when a user initiates a channel change in step 230, the present system performs a channel change blanking in step 232 and tunes in the new channel in step 234. However, after tuning in the new channel, and before unblanking the television display, the present system determines whether the program related information based channel blocking feature is enabled by the user in step 236. If not, the system allows user access to the channel in step 264 and exits the program in step 266.

If the channel blocking feature is enabled, the present system determines in step 238 whether the newly selected channel is the same as the previously selected channel in step 238. This determination may provide an indication that the user is continually re-tuning to the same channel in an attempt to bypass the program related information based blocking feature. If the newly selected channel is the same as the previously selected channel, the system may go through 2 additional optional steps or go immediately to step 268 wherein user access to the new channel is prevented and the process of determining a program related information and whether the user selected blocking criteria is met is performed thereafter.

In the first optional step 246, the system determines whether the newly selected channel previously contained objectionable material as indicated by its previously detected program related information. Using previously detected program related information enables the required program related information to be quickly determined. Step 246 may further include a determination of whether the newly selected channel's previously detected program related information was detected within a predetermined period of time. This prevents a decision to blank/unblank a channel from being based on program related information that is no longer relevant. For this purpose, the program related information of the previously selected channel and/or the channel previous to the previously selected channel may be stored in controller 110 for a predetermined period of time.

Alternatively, a counter or a timer may be used to determine how long ago a stored program related information was determined. Conventional methods may be used to store a previously detected program related information and determine how long ago the information was detected. If the newly selected channel's previously detected program related information did not indicate objectionable material within a predetermined period of time, the present system allows user access to the channel through steps 242 and 244. It can be seen that optional step 246 allows the user to quickly switch back to a previously selected channel when the user does not intend to bypass the program related information based blocking system.

If the present system determines in optional step 246 that the newly selected channel's previously detected program related information indicated objectionable material, optional step 261 may be inserted to determine whether the user is repeatedly re-tuning to the same channel. Continually re-tuning to the same channel for at least a predetermined number of times is further indication that the user is trying to bypass the program related information based blocking feature. Requiring a predetermined number of re-tunes may avoid inconvenience to users not attempting to bypass the blocking feature.

Optional step 261 comprises updating a Same Channel Counter in step 260 and comparing the Same Channel Counter with a preselected value, which may be preprogrammed or user selectable. If the Same Channel Counter is less than the preselected/preprogrammed value, the system allows user access to the channel in step 244. However, if the Same Channel Counter is equal to or exceeds the preselected/preprogrammed value, the present system prevents user access to the new channel and proceeds to detect the program related information and determine whether the user selected blocking criteria is met in steps 272–284.

It can be seen that steps 270–284 correspond to steps 212–226 of the system described above in relation to FIG. 2. Essentially, the present system seeks to continuously detect program related information within a predetermined amount of time, then determine whether a user selected blocking criteria is met by comparing the detected program related information with a user selected program related information and controls user access to the selected channel based on the determination.

Further, the present system provides an additional layer of protection against attempts to bypass the program related information blocking feature by continually switching between two different channels. This protection is provided by steps 240–244. Once the system determines in step 238 that the newly selected channel is not the same as the previously selected channel, step 240 determines whether the newly selected channel is the same as the channel selected immediately prior to the previously selected channel. An affirmative response to step 240 indicates that the user may be switching back and forth between two channels to exploit the delay time discussed above. In that case, the system again goes to optional step 246 to determine whether objectionable material was indicated in the channel selected prior to the previously selected channel, and if so, prevents access to that channel. Again optional step 261 may be inserted to allow a predetermined number of channel switches before the program related information based blocking feature is activated. If optional steps 246 and 261 are not present, the system goes to step 268 to keep the new channel blanked.

It can be seen that step 240 may be modified as necessary to prevent the user from bypassing the program related information based blocking system by rotating through a predetermined number of channels.

If the newly selected channel is not the same as either the previously selected channel or the channel previous to the previously selected channel, the present system sets the Same Channel Counter to 0 in step 242, allows user access to the channel in step 244 and goes into the routine for detecting program related information and determining whether a user selected blocking criteria is met as indicated in steps 270–284.

It will be apparent to those skilled in the art that although the invention has been described in terms of an exemplary embodiment, modifications and changes may be made to the disclosed embodiment without departing from the essence of the invention.

It is herein recognized that the channel blanking described above may be accomplished using any one of a number of conventionally known methods, or combination of methods, for example by using the normal channel change blanking mechanism already built into a signal receiver together with another blanking mechanism to provide additional blanking beyond the normal channel change blanking period, or by using the normal channel change blanking mechanism wherein the blanking period is extended as desired.

Also, the present series of steps shown in FIGS. 3–4 may be implemented for a variety of signal formats, both analog and digital, wherein auxiliary information is included with program signals. The above-described system and method may be adapted for use with any signal receiving system which can tune to one of a plurality of signal channels and provide an output signal associated with the tuned signal channel. As such, the present invention may be adapted for use with, but is not limited to, televisions adapted for NTSC, PAL or SECAM signals, digital television receivers, such as digital satellite signal receivers and HDTV receivers, VCRs, and internet based audio/video program systems.

Further, the present apparatus may be modified to compile a record of the number of attempts to re-select a channel that often includes objectionable programs. The compiled record may than be used to automatically block out certain channels or give the user an option of locking out certain channels.

Additionally, the present apparatus may be modified to control the output signal in a predetermined manner based on the number of attempts to re-select a particular channel in a given time period. Again, such an apparatus may be equipped with a recording mechanism to provide a record of the sequence of channel selections and to automatically block out or give the user an option of blocking out certain channels. Using the present apparatus in conjunction with a timer and a record of the sequence of channel selections, the apparatus may automatically block out or give the user an option of blocking out certain channels during certain time period.

Further, the present apparatus may be adapted for use with a television system having multiple signal inputs, wherein the apparatus automatically blocks an output signal associated with an external signal source, upon user selection of the external signal source, at least until program related information associated with a program signal from the external signal source is detected, and a determination of whether the user selected blocking criteria is met for the program signal from the external signal source is performed.

Therefore, it is to be understood that the present invention is intended to cover all modifications as would fall within the true scope and spirit of the present invention.

The invention claimed is:

1. An apparatus for processing and outputting a program signal, comprising:
   a data receiver (120, 122) for receiving a signal channel selection from a user;
   a tuner (100, 105) for selecting one of a plurality of signal channels in response to said signal channel selection from a user, the selected one of said plurality of signal channels including a program signal;
   a signal output (RGB OUT) for providing an output signal derived from said program signal;
   an auxiliary data decoder (115) for detecting program related information included in each said program signal; and
   a central processing unit (112) operatively connected to said data receiver, said signal input, said signal output and said auxiliary data decoder, wherein said central processing unit controls said output signal for preventing user access to said program signal upon detecting retuning of a previously selected channel thereby preventing user access during a time delay between tuning and receipt of program related information.

2. The apparatus according to claim 1, wherein said central processing unit controls said output signal for reducing user access to said program signal for at least until said program related information has been determined when said signal channel selection has been previously selected within a predetermined time period.

3. The apparatus according to claim 1, wherein said program signal is a television signal.

4. The apparatus according to claim 1, wherein said predetermined time period comprises the previous signal channel selection.

5. The apparatus according to claim 4, wherein said predetermined time period comprises the signal channel selection preceding said previous signal channel selection.

6. The apparatus according to claim 1, wherein said central processing unit controls said output signal for reducing user access to said program signal of said signal channel selection when a current channel selection has been previously selected within a predetermined time period and program related information of said previously selected channel meets a user selected blocking criteria.

7. The apparatus according to claim 6, wherein said central processor unit is capable of providing an On Screen Display menu for allowing user selection of said user selected blocking criteria.

8. The apparatus according to claim 7, wherein said central processing unit is capable of providing a restricted access On Screen Display menu for allowing user selection of said first user selected blocking criteria.

9. The apparatus according to claim 8, wherein access to said restricted access On Screen Display menu is password protected.

10. The apparatus according to claim 1, wherein said central processing unit controls said output signal for reducing user access to said program signal by one of blanking the video signal, replacing the video signal with an On Screen Display message, muting the audio signal and disabling associated closed captions.

11. The apparatus according to claim 1, wherein said central processing unit controls said output signal to reduce user access when said a current channel selection that has been previously selected within a predetermined time period is detected, unless said program related information was previously determined to be within an acceptable level within a predetermined period of time.

12. The apparatus according to claim 1, further comprising a signal input (101, 102) for receiving a second program signal from an external signal source, and a switch (140) operatively connected to said tuner, said signal input, said signal output and said central processing unit, said switch operatively coupling a respective one of said program signal and said second program signal with said signal output in response to a signal source selection from the user, wherein said signal processor controls said output signal for reducing user access to said output signal for at least until said program related information has been determined when a new signal source selection is received.

* * * * *